United States Patent [19]

Veligdan

[11] Patent Number: 5,381,502
[45] Date of Patent: Jan. 10, 1995

[54] FLAT OR CURVED THIN OPTICAL DISPLAY PANEL

[75] Inventor: James T. Veligdan, Manorville, N.Y.

[73] Assignee: Associated Universities, Inc., Washington, D.C.

[21] Appl. No.: 128,124

[22] Filed: Sep. 29, 1993

[51] Int. Cl.⁶ .............................................. G02B 6/04
[52] U.S. Cl. .................................. 385/115; 385/116; 385/120; 385/121; 348/742; 348/795
[58] Field of Search ................................ 385/115–120, 385/121, 146, 15; 313/422, 475; 348/742, 758, 795, 804, 56

[56] References Cited

U.S. PATENT DOCUMENTS

| | | | |
|---|---|---|---|
| 4,090,104 | 5/1978 | Vann et al. | 313/422 |
| 4,116,739 | 9/1978 | Glenn | 385/120 X |
| 4,173,391 | 11/1979 | Schure et al. | 385/120 |
| 4,208,096 | 6/1980 | Glenn, Jr. | 385/120 |
| 4,620,230 | 10/1986 | Spiger | 348/769 |
| 4,824,194 | 4/1989 | Karasawa | 385/146 |
| 4,974,095 | 11/1990 | Arov | 348/758 |
| 4,978,952 | 12/1990 | Irwin | 385/15 |
| 5,018,007 | 5/1991 | Lang et al. | 348/795 |
| 5,144,416 | 9/1992 | Hart | 385/56 |

*Primary Examiner*—John D. Lee
*Assistant Examiner*—Phan Thi Heartney
*Attorney, Agent, or Firm*—Margaret C. Bogosian

[57] ABSTRACT

An optical panel 10 includes a plurality of waveguides 12 stacked together, with each waveguide 12 having a first end 12a and an opposite second end 12b. The first ends 12a collectively define a first face 16, and the second ends 12b collectively define a second face 18 of the panel 10. The second face 18 is disposed at an acute face angle relative to the waveguides 12 to provide a panel 10 which is relatively thin compared to the height of the second face. In an exemplary embodiment for use in a projection TV, the first face 16 is substantially smaller in height than the second face 18 and receives a TV image, with the second face 18 defining a screen for viewing the image enlarged.

24 Claims, 4 Drawing Sheets

FLAT OR CURVED THIN OPTICAL DISPLAY PANEL

This invention was made with Government support under contract number DE-AC02-76CH00016, between the U.S. Department of Energy and Associated Universities, Inc. The Government has certain rights in the invention.

The present invention relates generally to fiber optics, and, more specifically, to an optic panel usable in a laser/optical projection video display.

BACKGROUND OF THE INVENTION

Video display screens are commonly used in television (TV) for example, and typically use cathode ray tubes (CRTs) for projecting the TV image. In the United States, the screen has a width to height ratio of 4:3 with 525 vertical lines of resolution. An electron beam is conventionally scanned both horizontally and vertically in the screen to form a number of picture elements, i.e. pixels, which collectively form the image. Color images are conventionally formed by selectively combining red, blue, and green pixels.

Conventional cathode ray tubes have a practical limit in size and are relatively deep to accommodate the required electron gun. Larger screen TVs are available which typically include various forms of image projection against a suitable screen for increasing the screen image size. However, such screens have various shortcomings including limited viewing angle, limited resolution, and limited brightness and typically are also relatively deep and heavy.

Various configurations are being developed for larger screen TVs which are relatively thin in depth. These include the use of conventional fiber optic cables in various configurations for channeling the light image from a suitable source to a relatively large screen face. However, typical fiber optic thin projection screens are relatively complex and wiry in levels of resolution and brightness. Accordingly, an improved thin or flat panel optical screen for use in a projection TV, for example, is desired.

SUMMARY OF THE INVENTION

An optical panel includes a plurality of waveguides stacked together, with each waveguide having a first end and an opposite second end. The first ends collectively define a first face, and the second ends collectively define a second face of the panel. The second face is disposed at an acute face angle relative to the waveguides to provide a panel which is relatively thin compared to the height of the second face. In an exemplary embodiment for use in a projection TV, the first face receives a TV image and the second face defines a screen for viewing the image.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
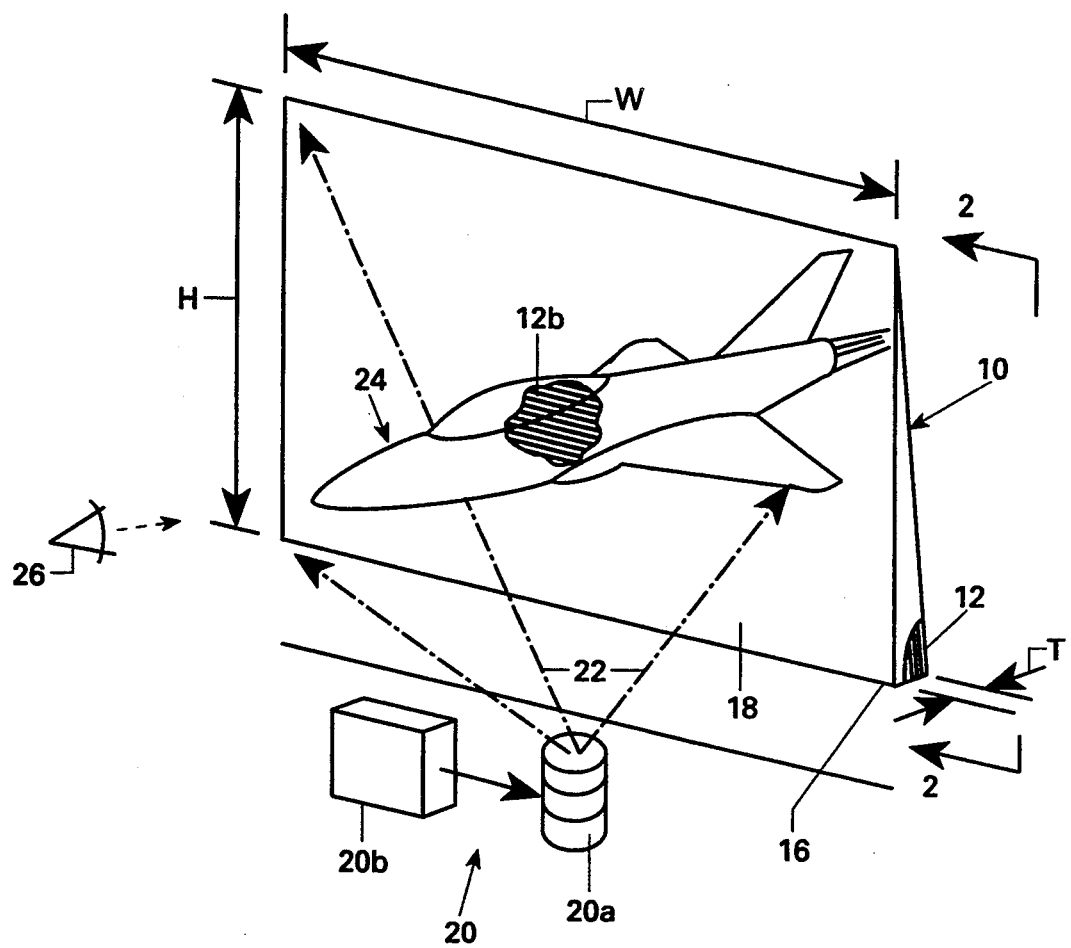
FIG. 1 is a schematic, perspective view of an exemplary optical panel in accordance with one embodiment of the present invention in the form of a large screen projection TV. The respective components of the invention are not drawn to scale herein.

Illustrated schematically in FIG. 1 is an optical panel 10 for guiding or channeling light therethrough which is in the exemplary form of a video display screen such as a projection screen TV. The panel 10 is illustrated in more particularity in FIG. 2 and includes a plurality of elongate light guiding optical waveguides 12 each having a longitudinal centerline axis 14 along which light is guided. The waveguides 12 are stacked laterally together and parallel to each other in abutting contact along their entire lengths, with each waveguide 12 having a first edge or end 12a which in this exemplary embodiment is an input end for receiving or passing light therethrough. Each waveguide 12 further includes a second edge or end 12b at an opposite end thereof relative to the centerline axis 14 which, in this exemplary embodiment, is an output end for emitting or passing the light carried through the waveguide 12. The first ends 12a, therefore, preferably include means for coupling light to deflate input ends for receiving light and passing the light into the waveguide 12. For example, the input ends 12a may be simply conventionally optically polished to receive light in an optimum manner, as one type of suitable means for coupling light. The waveguide output, second ends 12b are effective for emitting or dispersing the light channeled through the waveguides 12 as further described hereinbelow.

Figure 2:
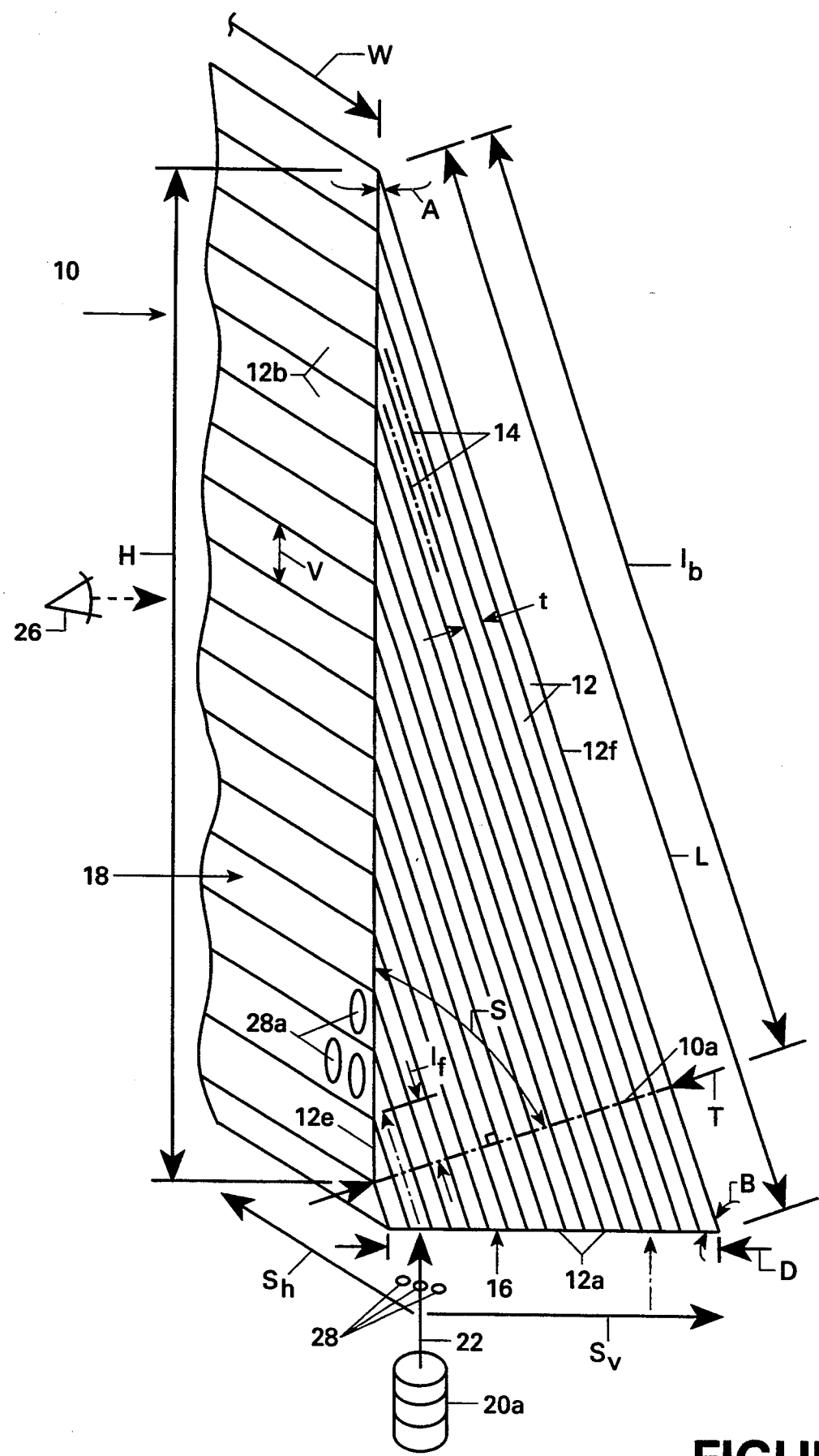
FIG. 2 is an enlarged, perspective, schematic elevational view of a portion of the optical panel illustrated in FIG. 1 and taken along line 2—2 therein and illustrates a plurality of exemplary planar optical waveguides therein.

In the exemplary embodiment illustrated in FIG. 2, the waveguides 12 are preferably in the form of generally flat sheets or ribbons each having a generally rectangular cross-section from the first end 12a to the second end 12b with a horizontal width W (see both FIGS. 1 and 2) being substantially greater than the thickness t of the waveguide 12. The waveguides 12 are stacked front-to-back in turn upon each other in abutting contact from the first to second ends 12a, 12b, with the second ends 12b extending continuously and horizontally along the width W without interruption from side-to-side.

As shown in FIG. 2, the first ends 12a of all the waveguides 12 are preferably disposed generally coplanar and collectively define a panel first or input face 16 for receiving light which first face 16 has a length or depth D. The second ends 12b of all the waveguides 12 are also preferably disposed generally coplanar and collectively define a panel second or output face 18, having a length or height H, which forms the viewing screen in this exemplary embodiment.

Figure 3:
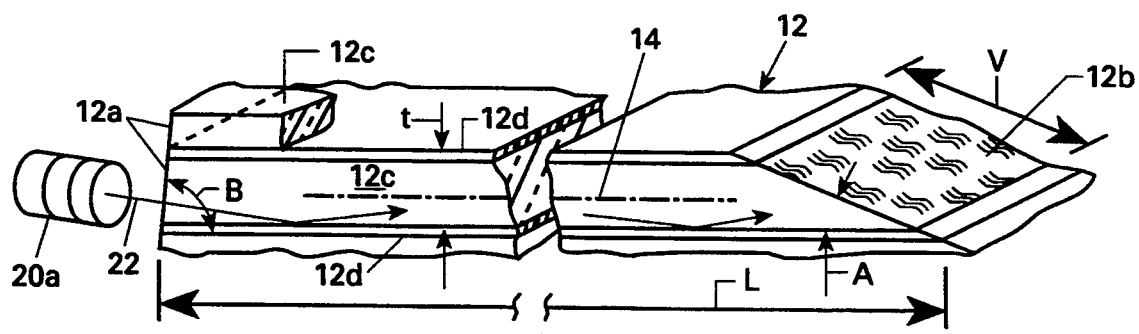
FIG. 3 is a partly sectional, enlarged view of an exemplary one of the waveguides illustrated in FIG. 2.

FIG. 3 illustrates in more particularity an exemplary one of the optical waveguides 12 shown in relation to portions of adjacent waveguides 12 in the panel 10. Each waveguide 12 includes an optically transparent core 12c having a suitable index of refraction or refractive index $n_1$ sandwiched between a pair of cladding sheets 12d having a lower refractive index $n_2$, i.e. $n_2$ being less than $n_1$. The light channeling property of the waveguide 12 is somewhat functionally equivalent to a conventional cylindrical fiber optic cable having a circular central core surrounded by an annular cladding with a lower refractive index so that light may be channeled therethrough and confined therein by total internal reflection. However, the ribbon waveguide 12 has significant additional advantages as described hereinbelow.

Referring again to FIG. 1, the panel 10 is disposed in combination with conventional means 20 for providing light in the form of a light beam 22 to the panel first face 16 for being observed from the panel second face 18 or viewing screen. The light providing means 20 may take any suitable and conventional form including for example a conventional scanning laser 20a illustrated schematically in FIG. 1 which is effective for emitting light in the form of a laser beam 22 into the first face 16. Suitable conventional electronics including a conventional intensity modulator 20b suitably control the generation of the beam 22 which is conventionally scanned over the first face 16 by a suitable scanning mirror to produce a video image 24 on the panel second face 18 using horizontal and vertical scanning. Since the panel 10 may have any suitable orientation in space, such as the vertical orientation shown in FIG. 1, the terms "vertical" and "horizontal" as used herein and in the claims broadly define two perpendicular directions in a relative sense for describing scanning both along the width W of the second face 18 (horizontal) and from waveguide-to-waveguide along the height H of the second face 18 (vertical). The panel 10 may alternatively be positioned horizontally in space for example, such as in a video game table, with vertical and horizontal scanning being relative to the observer looking downwardly at the screen panel 10.

The ribbon waveguide 12 allows the beam 22 to be scanned across the width W of the ribbon and propagated at any suitable angle therein within the plane of the ribbon. As shown in FIG. 1, the second face 18 is preferably vertically disposed in an exemplary TV viewing screen application for being observed by an observer indicated schematically at 26. In a preferred embodiment, the scanning laser 20a includes three scanning lasers which respectively produce laser beams of red, blue, and green light, and which are conventionally varied in intensity and combined in a controlled manner for producing color images on the panel second face 18. Alternatively, a conventional white light laser that produces the three primary colors may be used to produce the varying color image.

As shown in FIG. 3, the light beam 22 enters an exemplary one of the waveguides 12 at its first end 12a with a suitable acceptance angle for being channeled internally within the waveguide 12 to thereby be transmitted to the second end 12b from which it is viewable. Referring again to FIG. 2, the individual waveguides 12 are configured and stacked together in accordance with the present invention to provide a relatively thin (as shown by depth D) yet tall (as shown by height H) panel 10.

More specifically, the panel second face 18 is disposed at an acute face angle A relative to the waveguides 12 or their longitudinal axes 14 for defining an intermediate section 10a of the panel 10 of maximum thickness T between the first and second faces 16, 18 which sect on extends perpendicularly to the axes 14 from a front one 12e of the waveguides 12 to an opposite back one 12f of the waveguides 12. Again, the terms "front" and "back" as used herein and in the claims are relative terms for indicating the general stacking direction of the waveguides 12.

The panel 10 has its maximum thickness T at the intermediate section 10a as measured from the front waveguide 12e to the back waveguide 12f, and tapers in decreasing thickness along the vertical height of the panel second face 18 from the front to back waveguides 12e, 12f. The panel 10 also tapers in decreasing length of the respective waveguide 12 as their lengths are measured between the intermediate section 10a and the waveguide second ends 12b from that measured length of the back waveguide 12f, i.e. length $l_b$, to the front waveguide 12e, i.e. length lf.

The panel 10 is configured to be thin relative to the height H of the second face 18 in accordance with the present invention by being made to have a relatively small acute face angle A, with the panel maximum thickness T being less than the length $l_b$ of the back waveguide 12f from the second end 12b thereof to the intermediate section 10a, and less than the height H of the panel second face 18 as measured along the face 18 from the front waveguide 12e to the back waveguide 12f.

In the embodiment illustrated in FIG. 2, the intermediate section 10a is disposed perpendicularly to the longitudinal axes 14 and defines a spread angle S relative to the second face 18. The second face 18, the back waveguide 12f, and the intermediate section 10a define a right triangle in this exemplary embodiment, with the spread angle S being the complement of the acute face angle A, i.e., 90°—A. For a face angle A less than 45°, the maximum thickness T will be less than the length $l_b$ of the back waveguide 12f, as well as being less than the height H of the second face 18, which is the hypotenuse of the fight triangle. By selecting a face angle A which is almost zero in magnitude, the complement spread angle S is almost 90°, and the intermediate section 10a is positioned almost perpendicular to the panel second face 18 to provide a significantly thin panel 10 with a relatively large second face height H.

Once the panel second face 18 is suitably configured as described above, the panel first face 16 may take any suitable configuration while still having a thin panel 10. For example, and referring again to FIG. 2, the first and second faces 16, 18 in accordance with the exemplary TV application of the present invention being described are disposed substantially perpendicularly to each other, with the waveguides 12 extending obliquely between the first and second faces 16, 18. In this way, the light beam 22 may be directed vertically upwardly into the horizontal first or bottom face 16, and be viewed by the observer 26 generally perpendicularly to the vertical second or front face 18.

As illustrated in FIG. 2, each of the waveguides 12 between its ends 12a, 12b has a substantially uniform thickness t measured perpendicularly to its centerline axis 14, with all of the waveguides 12 having preferably equal thicknesses t and abutting each other for collectively defining a substantially uniform maximum thickness T of the entire untapered portion of the panel 10. As described above, the panel thickness decreases from the intermediate section 10a to its top end due to the acute face angle A. Each waveguide 12 may be conventionally manufactured from a suitable optical material such as transparent glass or plastic with the required refractive index in its core 12c and a suitable cladding 12d having a different refractive index for channeling light through the core 12c. As shown in FIG. 3, adjacent cores 12c in sheet form are separated by a common sheet of cladding 12d, with the thickness t of each waveguide 12, therefore, including a respective one of the cladding sheets 12d. The waveguides 12 may be formed by interleaving sheets of the cladding 12d between sheets of the core 12c and suitably bonding together the sheets to form an integral assembly. For example, the core 12c and cladding 12d may be different plastics joined together by heat, acoustic energy, or other suitable means. Or, the core 12c may be glass, with the cladding 12d being a suitable adhesive.

Since the first and second faces 16 and 18 are oblique or perpendicular to each other, and the waveguides 12 extend obliquely between the first and second faces 16, 18 in this exemplary embodiment, the waveguides 12 necessarily vary in total longitudinal length L with the longest waveguide 12 being the back waveguide 12f on the backside of the panel 10, and the shortest waveguide 12 being the front waveguide 12e on the front side of the panel 10. And, since the second face 18 is disposed at the acute face angle A relative to the waveguides 12 or the longitudinal axes 14 thereof, each of the waveguide second ends 12b in the second face 18 is preferably beveled at the same acute face angle A to form a planar and continuous second face 18. In the exemplary embodiment illustrated in FIG. 2, the panel second face 18 extends vertically, with each of the waveguide second ends 12b having a vertical height V, with the vertical height H of the second face 18 being simply the sum of the individual vertical heights V. The height, or depth D of the first face 16 measured from the front to the back of the panel 10 is substantially or almost equal to the panel maximum thickness T in the illustrated embodiment. The first face depth D and the panel maximum thickness T are substantially smaller than the second face height H to provide the relatively thin yet tall panel 10 as described above.

More specifically, in a preferred and exemplary embodiment configured for standard US television having 525 lines of resolution, 525 of the waveguides 12 would be provided to provide 525 vertical waveguide second ends 12b forming the panel second face 18 or viewing screen. The height H of the second face 18 may be arbitrarily selected at about 1 meter, with the widths W of the waveguides 12 also being arbitrarily selected at 1.33 meters to effect a standard U.S. TV width-to-height ratio of 4:3. Of course other width-to-height ratios may be suitably selected and the vertical resolution may be increased or decreased as desired by simply changing the number and size of stacked waveguides 12.

In order to have a suitably thin panel 10, the face angle A may be selected as small as practical for effectively channeling the light beam 22 from the waveguide first ends 12a to the second ends 12b. For example, in order to have a panel maximum thickness T of about 2.54 cm, and a panel second face height H of 1 meter (100 cm), the required face angle A is merely the inverse sine of 2.54/100 which is 1.46°. The spread angle S is therefore 90° minus 1.46° or 88.54° which is almost 90°. The thickness t of each of the waveguides 12 is correspondingly 2.54 cm/525 which is about 48 microns of which the required cladding thickness is relatively small and on the order of about 1 or 2 microns. In view of this substantially small bevel or face angle A and large spread angle S, an optical panel 10 having a tall viewing screen 18 may be made which is also significantly thin in its depth from front to back. Since the first face 16 is preferably perpendicular to the second face 18 in this exemplary embodiment, the thickness of the panel 10 as measured by the depth D of the first face 16 is simply the panel maximum thickness T divided by the cosine of the face angle A which is substantially equal to the panel thickness T itself. Note that the included angle B between the axes 14 of the waveguides 12 and the panel first face 16 is slightly less than 90° in this exemplary embodiment, or 90°−1.46°=88.54°, and is equal to the spread angle S in the exemplary embodiment illustrated.

In the preferred embodiment illustrated in FIG. 2, the waveguide second ends 12b are preferably vertically continuous with each other from the front to back waveguides 12e, 12f to form a vertically continuous second face 18 therebetween, there being 523 waveguides stacked therebetween for a total of 525 waveguides 12. Since the waveguides 12 are preferably in ribbon or sheet form and stacked together like book pages, the resulting second face 18 includes substantially no dead space, the only dead space being due solely to the relatively small amount of cladding exposed thereat, thus a substantially 100% light emitting or viewing surface is provided. Such a surface provides an enhanced and higher brightness level of light as compared to conventional fiber optic cables having circular configurations which would have substantial dead space between abutting adjacent fibers. Furthermore, the second face 18 is horizontally continuous without interruption along its width W since flat ribbon waveguides 12 are preferred and may be made as wide or as narrow as desired. The second face 18 is therefore continuous and flat both vertically and horizontally. However, in alternate embodiments it may be non-planar and interrupted if desired.

As shown in FIG. 2, the scanning laser 20a is conventionally effective for scanning the laser beam 22 both horizontally along the widths W of the waveguide first ends 12a to effect a horizontal scan $S_h$ in the first face 16 which is carried to the second face 18, and from waveguide-to-waveguide in the first face 16, from front to back, to effect a vertical scan $S_v$ carried to the second face 18, with each scan location defining a discrete picture element or pixel 28. The cross-sectional area of the laser beam 22 may be conventionally selected relative to the thickness t of the waveguides 12 to transmit a circular pixel, for example, into the first end 12a. The pixel 28 will be elongated at the waveguide second end 12b by the reciprocal of the inverse sine of the face angle A which is about forty-times, for example in the preferred embodiment described above. The vertical resolution of the second face 18 is merely the number of corresponding pixels 28a produced therein which is equal to the number of waveguides 12, for example 525. The horizontal resolution, however, is selectively variable as desired by simply controlling the number and size of the horizontal pixels 28 produced by the scanning laser 20a. Accordingly, the number of pixels 28 both vertically and horizontally may be selected as desired for controlling the resolution as well as the size of the image 24 produced on the panel second face 18. And since substantially 100% of the surface area of the panel second face 18 is the light carrying core material 12c, substantial brightness is obtained therefrom without significant dead space.

As shown in FIG. 2, the panel 10 is configured for positioning the second face 18 vertically for the observer 26 to view the image 24 thereon by merely horizontally facing the second face 18. In this way, the observer 26 cannot look directly into the laser beams 22 channeled longitudinally through the waveguides 12. As shown in FIG. 3, the waveguide second ends 12b are preferably conventionally optically frosted for diffusing light therefrom for forming the pixels 28a thereon. As shown in FIG. 1, the scanning laser 20a of the light providing means 20 is effective for transmitting a television or video image 24 vertically upwardly into the horizontal first face 16 for viewing from the vertical second face 18 which is disposed perpendicularly to the first face 16. A substantially large laser scanning projection TV is thereby created. And, most significantly, the depth or maximum thickness T of the optical panel 10 is significantly small for providing a relatively thin or flat panel screen for viewing.

Figure 4:
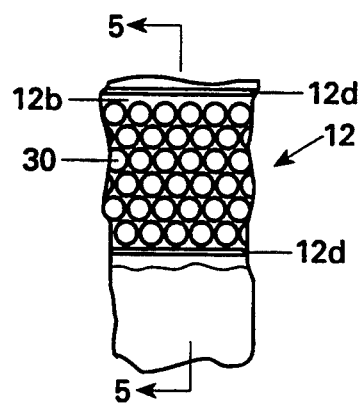
FIG. 4 is an end view of a portion of a second end of one of the waveguides illustrated in FIG. 2 in an alternate embodiment including a plurality of concave indentations therein.
Figure 5:
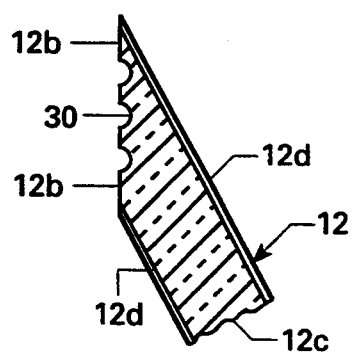
FIG. 5 is an elevational sectional view through the end of the waveguide illustrated in FIG. 4 and taken along line 5—5.

The waveguide second ends 12b may take other forms for suitably diffusing light to produce the resulting image 24 such as shown for example in FIGS. 4 and 5. In this alternate embodiment, each of the waveguide second ends 12b includes a plurality of vertically anti horizontally spaced apart concave indentations or negative lenses 30 for diffusing the light emitted therefrom for viewing by the observer 26 (see FIG. 1) perpendicularly to the waveguide second end 12b.

Figure 6:
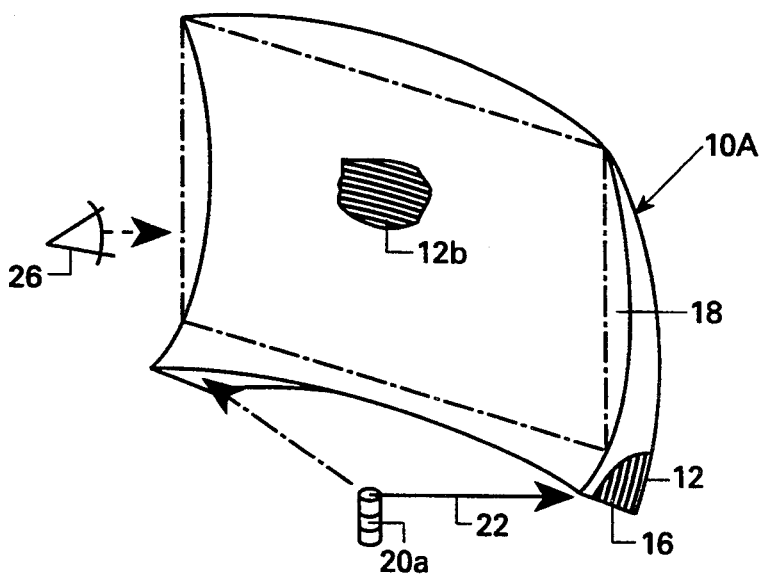
FIG. 6 is a schematic view of an optical panel in accordance with another embodiment of the present invention wherein the waveguides are arcuate.

In the embodiment of the invention illustrated in FIGS. 1-5, each of the waveguides 12 is preferably planar or fiat from its first end 12a to its second end 12b without bending or twisting thereof. Furthermore, the second face 18 as shown in FIGS. 1 and 2 is also preferably planar or fiat for providing a generally fiat viewing screen. Similarly, the first face 16 is also preferably planar or flat. In alternate embodiments, the first and second laces 16 and 18 need not be planar but may be varied in shape as desired. For example, FIG. 6 illustrates the optical panel in accordance with an alternate embodiment designated 10A which is not a planar or flat screen but is nevertheless thin in its depth relative to the height and width of the screen. In this embodiment, each of the waveguides 12 is arcuate, for example vertically arcuate along the longitudinal axes 14 (see FIG. 1), and the second face 18 is correspondingly vertically concave. The waveguides 12 may also be horizontally arcuate along the waveguide width W (see FIG. 1) and the second face 18 may be also correspondingly horizontally concave. By combining both vertically and horizontally arcuate waveguides 12 to form a both horizontally and vertically concave second face 18, the second face 18 may be a portion of a spherical surface to provide a wraparound viewing effect of the screen for the observer 26 positioned at a suitable viewing point thereof.

Furthermore, the first face 16 may be horizontally concave along the waveguide width W and face downwardly toward the laser 20a so that the scanning laser 20a may transmit the laser beam 22 thereto with less of an incidence angle relative thereto.

The optical panel 10 described above effectively provides a relatively large viewing area with a significantly thin screen and provides high resolution and brightness. As described above, the vertical resolution may be changed by varying the number of stacked waveguides 12 which, for a high definition TV (HDTV) system would use 1,100 waveguides 12 for obtaining 1,100 lines of resolution. The horizontal resolution is simply controlled by varying the number of pixels 28 by changing the laser spot size produced along the width of each waveguide 12. The laser light beam 22 enters the stacked waveguides 12 at the bottom, first face 16 after being reflected from a scanning mirror of the laser 20a which rasters the beam 22 horizontally across each waveguide 12 for the horizontal scan $S_h$ as well as for the vertical scan $S_v$. The light beam 22 travels upwardly through each of the waveguides 12 and exits the respective second ends 12b which form the viewing screen, or second face 18.

The light providing means 20 may take any conventional form and may use conventional mechanical scanning mirrors for scanning the light into the panel first face 16, or may use other suitable acousto-optic or electro-optic devices as desired.

Since the panel 10 functions to channel or guide light or similar energy, its two faces 16, 18 may have any suitable coatings or devices cooperating therewith to enhance transmission or dispersion characteristics of the channeled beam as desired. The beam may enter the first face 16 and exit the second face 18 as described above, or vice versa, depending upon the desired application of the panel 10.

Figure 7:
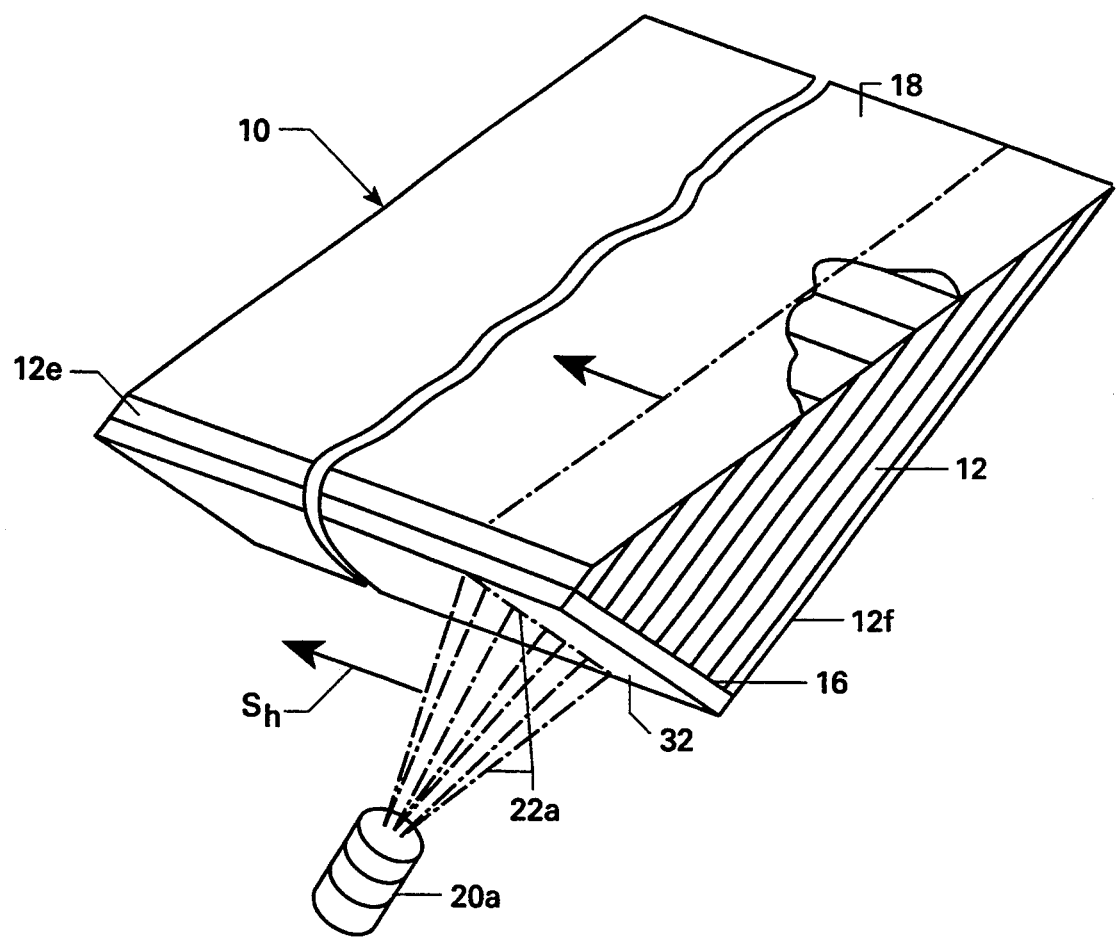
FIG. 7 is a schematic view of an optical panel in a large screen projection TV in accordance with another embodiment of the invention having a light modulator at an input face thereof.

For example, FIG. 7 illustrates schematically the panel 10 in accordance with an alternate embodiment of the invention also in the form of a projection TV like that shown in FIG. 1. However, in this embodiment, conventional means in the form of a light modulator 32 adjoins the panel first face 16 for modulating the intensity of the input light from the laser 20a.

The laser 20a conventionally produces a line or strip of light 22a into the modulator 32 simultaneously across or over all 525 waveguides 12 from the front waveguide 12e to the back waveguide 12f. Whereas the circular laser beam 22 in the FIG. 1 embodiment must raster each of the 525 waveguides 12 individually, the strip laser beam 22a in FIG. 7 simultaneously scans all 525 waveguides 12 together. This will provide a higher refresh rate on the screen, or panel second face 18, and reduce or eliminate flicker.

The light modulator 32 modulates each laser beam strip 22a from waveguide-to-waveguide 12 to vary the intensity of the light at each of the 525 waveguides to provide a simultaneous scan line to form a vertical line of the image on the second face 18. The laser beam strip 22a is then scanned horizontally along the width of the waveguides, i.e. $S_h$, to produce the resulting two-dimensional images on the second face 18.

The light modulator 32 may take any suitable form which is effective to modulate light at each of the plurality of waveguides 12 in the two perpendicular directions along the width of the waveguides 12 and from the front to back waveguides 12e, 12f to produce a two-dimensional checkerboard-type grid. The vertical resolution of the second face 18 is again limited by the number of waveguides 12 stacked together, with the horizontal resolution being selectively variable by both thickness of the laser beam strip 22a and resolution capability of the light modulator 32.

For example, the light modulator 32 may be in the form of a conventional thin film semiconductor suitably bonded to or adjoining the panel first face 16 for modulating the input light into the waveguides 12. Conventional Active Matrix Liquid Crystal Displays (AMLCD), or Spatial Light Modulators (SLM) being developed, or other suitable devices may be used to provide the required light modulation.

Of course, since the thin optical panel 10 is a uniquely efficient device for channeling light, it may have other uses besides large screen projection TV. It may be used wherever a relatively thin, lightweight, high resolution and brightness light channeling device is required wherein the thin panel provides advantage.

Although the waveguides 12 are preferably in ribbon form, conventional cylindrical optical fibers could also be configured in accordance with the present invention with at least one end being sharply bevelled to define an acute angle with the longitudinal axes of the fibers. However, this would then predetermine the horizontal resolution as well as the vertical resolution, and provide dead space between the fibers which would decrease screen brightness.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. An optical panel for guiding light comprising:
   a plurality of light channeling optical waveguides 12 each having a first end 12a for passing light, an opposite, second end 12b for passing light, and a longitudinal axis 14 extending between said first and second ends 12a, 12b, said waveguides 12 being stacked laterally together from said first to second ends 12a, 12b, with said longitudinal axes 14 being generally parallel to each other;
   said first ends 12a of all said waveguides 12 being disposed generally coplanar and collectively defining a panel first face 16;
   said second ends 12b of all said waveguides 12 being disposed generally coplanar and collectively defining a panel second face 18;
   said panel second face 18 being disposed at an acute face angle relative to said longitudinal axes 14 of said waveguides 12 thereby to define an intermediate section 10a of said panel extending from a front one 12e of said waveguides 12 to an opposite back one 12f of said waveguides 12;
   said panel having a maximum thickness at said intermediate section 10a and tapering in thickness along said panel second face 18 from said front waveguide 12e to said back waveguide 12f, and tapering in length between said intermediate section 10a and said waveguide second ends 12b from said back waveguide 12f to said front waveguide 12e;
   said panel maximum thickness being less than said length of said back waveguide 12f from said second end 12b thereof to said intermediate section 10a, and being less than the height of said panel second face 18 from said front waveguide 12e to said back waveguide 12f; and
   said waveguides 12 being in the form of ribbons each having generally rectangular cross-sections from said first end 12a to said second end 12b, with a width W greater than said maximum thickness of said intermediate section 10a of said panel;
   said waveguides 12 being stacked front-to-back in turn upon each other with said second ends 12b extending continuously along said width W.

2. A panel according to claim 1 wherein said intermediate section 10a is disposed almost perpendicularly to said panel second face 18.

3. A panel according to claim 2 wherein:
   said waveguide first ends 12a include means for coupling light to define input ends for receiving light and passing said light into said waveguides 12; and
   said waveguide second ends 12b are output ends for emitting said light channeled through said waveguides 12.

4. A panel according to claim 1 wherein said waveguide second ends 12b in said second face 18 are beveled at said acute face angle.

5. An optical panel for guiding light comprising:
   a plurality of light channeling optical waveguides 12 each having a first end 12a for passing light, an opposite, second end 12b for passing light, and a longitudinal axis 14 extending between said first and second ends 12a, 12b, said waveguides 12 being stacked laterally together from said first to second ends 12a, 12b, thereby to position said longitudinal axes 14 generally parallel to each other;
   said first ends 12a of all said waveguides 12 being disposed generally coplanar and collectively defining a panel first face 16;
   said second ends 12b of all said waveguides 12 being disposed generally coplanar and collectively defining a panel second face 18;
   said panel second face 18 being disposed at an acute face angle relative to said longitudinal axes 14 of said waveguides 12 for defining an intermediate section 10a of said panel extending from a front one 12e of said waveguides 12 to an opposite back one 12f of said waveguides 12;
   said panel having a maximum thickness T at said intermediate section 10a and tapering in thickness along said panel second face 18 from said back waveguide 12f to said front waveguide 12e, and tapering in length between said intermediate section 10a and said waveguide second ends;
   said panel maximum thickness T being less than said length of said back waveguide 12f from said second end 12b thereof to said intermediate section 10a, and less than the height of said panel second face 18 from said front waveguide 12e to said back waveguide 12f; and
   each said second ends 12b having a width W that exceeds said maximum thickness T of said intermediate panel section 10a.

6. A panel according to claim 5 wherein:
   each of said waveguides 12 has a substantially uniform thickness between said first and second ends 12a, 12b, ant said waveguides 12 abut each other to collectively define said maximum thickness of said panel;
   said first face 16 has a depth substantially equal to said panel maximum thickness; and said second face 18 has a height, with said first face depth being smaller than said second face height.

7. An optical panel for guiding light comprising:

a plurality of light channeling optical waveguides 12 each having a first end 12a for passing light, an opposite, second end 12b for passing light, and a longitudinal axis 14 extending between said first and second ends 12a, 12b, said waveguides 12 being stacked laterally together from said first to second ends 12a, 12b, thereby to position said longitudinal axes 14 generally parallel to each other;

said first ends 12a of all said waveguides 12 being disposed generally coplanar and collectively defining a panel first face 16;

said second ends 12b of all said waveguides 12 being disposed generally coplanar and collectively defining a panel second face 18;

said panel second face 18 being disposed at an acute face angle relative to said longitudinal axes 14 of said waveguides 12 for defining an intermediate section 10a of said panel extending from a front one 12e of said waveguides 12 to an opposite back one 12f of said waveguides 12;

said panel having a maximum thickness T at said intermediate section 10a and tapering in thickness along said panel second lace 18 from said back waveguide 12f to said front waveguide 12e, and tapering in length between said intermediate section 10a and said waveguide second ends 12b;

said panel maximum thickness T being less than said length of said back waveguide 12f from said second end 12b thereof to said intermediate section 10a, and being less than the height of said panel second face 18 from said front waveguide 12e to said back waveguide 12f;

said waveguides 12 being in the form of ribbons each having generally rectangular cross-sections from said first end 12a to said second end 12b, with a width W substantially greater than a thickness t of said waveguide 12;

said waveguides 12 being stacked front-to-back in turn upon each other with said second ends 12b extending continuously along said width W, and a continuous unclad outer surface portion thereof having no dead space along the width W; and wherein said waveguide second ends 12b are continuous with each other from said front to back waveguides 12e, 12f to form a continuous second face 18 for transmitting light therefrom.

8. A panel according to claim 7 in combination with light providing means 20 for providing light to said first lace 16 for being channeled through said waveguides and emitted from said second face 18.

9. An optical panel combination according to claim 8 wherein said light providing means 20 is effective for providing a light image 24 into said first face 16 for viewing from said second face 18.

10. An optical panel combination according to claim 8 wherein said light providing means 20 is in the form of a scanning laser 20a effective for emitting a laser beam 22 into said first face 16, said beam 22 being scannable both horizontally along said waveguide first ends 12a to effect a horizontal scan in said second face 18, and from waveguide-to-waveguide in said first face 16 to effect a vertical scan in said second face 18, with each scan location defining a discrete pixel 28.

11. An optical panel combination according to claim 10 wherein the number of said pixels 28 in said vertical scan is equal to the number of said waveguides 12, and the number of said pixels 28 in said horizontal scan is selectively variable by said light providing means 20.

12. An optical panel combination according to claim 8 further comprising light modulating means 32 for modulating light adjoining said panel first face 16.

13. An optical panel combination according to claim 12 wherein:

said light providing means 20 provides a laser beam strip 22a into said light modulating means 32 simultaneously over all said waveguides 12 from said front waveguide 12e to said back waveguide 12f, and is scannable along said waveguide width to effect a horizontal scan in said second face 18; and said light modulating means 32 is effective for modulating said laser beam strip 22a from said front to back waveguides 12e, 12f.

14. A panel according to claim 7 wherein each of said waveguides 12 is arcuate.

15. A panel according to claim 7 wherein said waveguides 12 are arcuate along said longitudinal axes 14, and said second face 18 is correspondingly concave.

16. A panel according to claim 7 wherein said waveguides 12 are arcuate along said waveguide width and said second face 18 is correspondingly concave.

17. A panel according to claim 7 wherein said waveguides 12 are arcuate both along said longitudinal axes 14 and along said waveguide width, and said second face 18 is correspondingly concave.

18. A panel according to claim 7 wherein said waveguide second ends 12b are frosted for diffusing light emitted therefrom.

19. A panel according to claim 7 wherein said waveguide second ends 12b include a plurality of spaced apart concave indentations 30 for diffusing light emitted therefrom.

20. A panel according to claim 7 wherein each of said waveguides 12 is planar.

21. A panel according to claim 7 wherein said first face 16 is concave along said waveguide width.

22. A panel according to claim 7 wherein said second face 18 is planar.

23. A panel according to claim 7 wherein said first face 16 is planar.

24. A panel according to claim 7 wherein both said first and second faces 16, 18 are planar.

* * * * *